(12) United States Patent
Goode et al.

(10) Patent No.: US 6,472,483 B1
(45) Date of Patent: Oct. 29, 2002

(54) DRY PRODUCT DISCHARGE FROM A GAS PHASE POLYMERIZATION REACTOR OPERATING IN THE CONDENSING MODE

(75) Inventors: Mark Gregory Goode, Hurricane, WV (US); Mark Williams Blood, Hurricane, WV (US); Timothy Joseph Howley, Charleston, WV (US); Billy Jack Garner, Charleston, WV (US); Robert Darrell Olson, Charleston, WV (US); Ralph Niels Hesson, Victoria, TX (US); Thomas Walter Pilgrim, Port Lavaca, TX (US); John Roberts Parrish, Cross Lanes, WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/514,167

(22) Filed: Feb. 28, 2000

(51) Int. Cl.$^7$ .................................................. C08F 2/34
(52) U.S. Cl. ............................. 526/88; 526/65; 526/70
(58) Field of Search .......................... 526/65, 88, 901, 526/70

(56) References Cited

U.S. PATENT DOCUMENTS

| 4,535,134 A | | 8/1985 | de Lorenzo et al. .......... 526/88 |
| 4,588,790 A | | 5/1986 | Jenkins, III et al. .......... 526/70 |
| 4,621,952 A | * | 11/1986 | Aronson ...................... 406/138 |
| 4,877,587 A | | 10/1989 | Rhee et al. .................. 422/135 |
| 5,382,638 A | * | 1/1995 | Bontemps et al. ............. 526/67 |
| 5,405,922 A | | 4/1995 | DeChellis et al. ............. 526/68 |
| 5,436,304 A | | 7/1995 | Griffin et al. ................. 526/68 |
| 5,453,471 A | | 9/1995 | Bernier et al. ................ 526/68 |
| 6,001,938 A | * | 12/1999 | Chinh et al. .................. 526/68 |
| 6,262,192 B1 | | 7/2001 | Wu ............................... 526/67 |

FOREIGN PATENT DOCUMENTS

| EP | 0830892 | | 3/1998 |
| EP | 0830892 A1 | * | 3/1998 |

* cited by examiner

Primary Examiner—David W. Wu
Assistant Examiner—William Cheung

(57) ABSTRACT

The liquid content of granular product removed from a fluidized bed polymerization reactor operating in the condensing mode is reduced or minimized by removing the product from a level in the fluidized bed which is about 0.21 to about 0.59 of its height while venting the product discharge tank to a point higher in the fluidized bed.

42 Claims, 3 Drawing Sheets

DRY PRODUCT DISCHARGE FROM A GAS PHASE POLYMERIZATION REACTOR OPERATING IN THE CONDENSING MODE

TECHNICAL FIELD

This invention relates to the continuous or intermittent removal of particulate polymer product from a fluidized bed system operating in the condensing mode, that is, where liquid is added, recycled and condensed outside the reactor to enhance the removal of the heat of reaction.

BACKGROUND OF THE INVENTION

The widely used "Unipol" fluidized bed olefin polymerization process employs two tanks in series for the intermittent removal of granular polymer from the fluidized bed, generally as is illustrated in Aronson's U.S. Pat. No. 4,621,952. In the original design for use with a dry gas phase reaction system, the discharge nozzle was located near the bottom of the fluidized bed. Recent advancements in heat removal and reactor static control have led to partial condensation of the reactor feed gas. The two-phase vapor and liquid mixture enters the reactor fluidized bed from the bottom. Thus significant quantities of liquid may exist at and near the bottom of the fluidized bed. The inlet fluid is ultimately completely vaporized, absorbing the heat of reaction as it moves upward through the polymerization zones of the fluidized bed reactor. But unfortunately during a discharge event, liquid may be carried out of the reactor along with the granular polymer when it is removed for further processing and shipment. Significant cooling can occur within the product discharge tanks as the liquid vaporizes.

Vaporization of liquid in the product discharge system may cause the pressure in the blow tank and other parts of the system to approach dangerous and/or maximum allowed working pressures, as the original design for the equipment for a dry system did not anticipate such vaporization. Particularly in the case of polypropylene production, this can be a limiting production rate factor.

The pressure in the product discharge tanks is affected particularly by flashing of the liquid from the product as soon as it enters the relatively low pressure product discharge tank. In addition, any liquid which remains in the liquid phase takes up volume in the tank which could be occupied by resin product, and tends to reduce flowability of the resin. The upward flow of gas vaporizing from liquid originally settling in the bottom of the tank provides resistance to the downward flow of the granular product, thus also retarding the introduction of the product to the tank.

Low temperatures may occur in the product discharge tank or the blow tank as the liquid evaporates, especially when the condensing agent is propylene or propane.

The liquid that escapes with the resin out of the reactor must be recovered into the reaction system to achieve economical use of feedstocks. Commercial systems are designed with elaborate monomer and feedstock recovery schemes for this purpose. One of these is the Unipol improved product discharge system, sometimes called the IPDS. Regardless of the recovery scheme, it is clearly advantageous to reduce the amount of liquid that escapes with the resin. If the amount of liquid reaching the product discharge tank is minimized, the size and costs of the recovery equipment can be reduced and less feedstock may be lost.

The liquid's flash may also reduce the resin's temperature in the product discharge system. This is undesirable where the solubility of monomer and/or condensing agent in the product is enhanced by lower temperatures.

Liquid may also contribute to progressive increases in the baseline pressure of a product discharge system over multiple resin discharge cycles. Baseline pressure is that pressure in the product discharge tank when the discharge valve first opens or the pressure in an empty tank as the system cross-ties. An increase in baseline pressure reduces monomer savings effected by a cross-tie to another tank.

Generally, the prior art has not dealt with the above problems caused by the ever-increasing quantities of liquid present in the system and liable to be removed from the reactor with product. Patents disclosing product discharge configurations after the above mentioned Aronson patent 4,621,952 have not addressed minimizing the amount of liquid in the product. See, for example, DeLorenzo U.S. Pat. No. 4,535,134, which employs weirs in a horizontal reactor. The weirs tend to assure that the product removed has already settled at levels higher than half the height of the reactor, but in the end the product drain used at the end of the reactor is at its bottom. The apparatus of EP 0 830 892 A1 removes product from the top of the fluidized bed primarily by gravity in order to minimize the amount of gas removed with the product.

The sloped discharge (of EP 0 890 892) is said to be from 0.6 to 0.95H. This allows sufficient height that the discharge system tanks and associated hardware can be built at ground level when the reactor vessel is essentially located at ground level. The 0.6H to 0.95H specification also accommodates the height required in the construction of the sloped chute from the reactor port to the resin receiving vessel. The removal of product high in the reactor also aids in the removal of resin fines that are prone to accumulate near or at the top of the fluidized bed. That is particularly a problem when operating with a cyclone separator in the gas recirculation line from the top of the reactor to the bottom. Fines in the recirculating gas are separated and returned to the top of the fluid bed by the cyclone. See Bontemps et al U.S. Pat. No. 5,382,638.

As indicated in the above mentioned Aronson patent 4,621,952, product may be removed from the reactor to the product discharge tank by utilizing the difference in pressure between the upper and lower ports of the fluidized bed. While there is an initial rush of polymer particles into the discharge vessel when the discharge valve is opened due to gravity and the pressure difference between the reactor and the discharge vessel, this is ineffective in filling the vessel to near its capacity within a practical time limit. To increase the rate of product discharge after the initial rush, a vent is opened to the upper regions of the reactor to take advantage of the pressure difference, typically from 2 to 12 psi, between the higher pressure low regions and the low pressure upper regions of the bed. Some of the upward flowing fluidizing gas is caused to leave the bed and pass through the discharge vessel to reach the upper region of the bed, and in so doing, product is conveyed from the reactor into the discharge vessel. This greatly increases the amount of product removed during each discharge cycle.

While we do not purport to coin any new terms, it may be useful to discuss the meanings of a few terms used in this application, as there may be some disagreement among practitioners of the art as to their meanings. For example, we have construed the letter "H" as used in EP 0 830 892 A1 to mean the height of the reactor wall around the fluidized bed as illustrated in that patent—in other words the height of the fluidized bed as defined by the straight or cylindrical wall only, beginning with the distributor plate, terminating at the top of the straight or cylindrical wall, and not including the expanded zone above the straight or cylindrical wall or any conical section such as is commonly used to transition from the straight (cylindrical) section to the expanded section. This is the meaning used in the present application. When we state that a port in the reactor wall is located at a certain distance from the distributor plate, such as 0.15H, we mean that the center of the port is at that vertical distance from the distributor plate. Also, the term "condensing mode" is used to include a fluidized bed process in which fluid from the reactor is removed, cooled and condensed to remove the heat of reaction, and returned to the reactor. The fluid may contain from 1% to 95% liquid by weight after cooling and condensing, and may or may not contain non-reactive materials added to enhance the efficiency of heat removal. Thus, as an example, where 20% by weight of the recycled fluid entering the reactor after cooling and condensing is liquid, the operation may be referred to as "20% condensing."

The concentration of liquid varies with height in the bed during condensing operation from most concentrated at about the distributor plate to the lowest concentration or no liquid in the cycle gas at the top of the fluid bed. This may be referred to as the extent of condensing penetration into the bed, the extent of condensing or the liquid or condensing gradient. It is also recognized that the concentration of liquid may vary radially in the bed, and the liquid gradient is meant to represent a composite average at a given height. The liquid may all vaporize within a relatively short distance above the distributor plate, such that the liquid concentration goes from its maximum concentration at about the plate to essentially zero. It is optimal that there be no liquid at the height of the resin discharge port to the product chamber (the product discharge tank), but it should be noted that some liquid can still be present and the performance of the product chamber (product discharge tank) may not be greatly affected.

The extent of condensing, or recycle liquid, penetration into the bed varies with many factors. Most obviously, the higher the condensing level, the greater the penetration. An increase in the cycle gas velocity at constant condensing level may increase the penetration of liquid into the bed during condensing mode operation, and can be detected using thermocouples inserted into the bed or along the internal wall of the reactor, as the vaporization of the liquid reduces temperatures. Increased liquid penetration can have a quieting effect on wall thermocouples in regions the liquid reaches. Electrical charge phenomena in the fluid bed are also mitigated by increased liquid penetration. An increase in cycle gas velocity at constant production rate during condensing mode operation may also increase liquid penetration even though the amount of condensing is less.

Condensing penetration is also affected by the design of the distributor plate, the hole size, the number of holes, the jet penetration at the plate, the pressure drop across the plate, the design of the cap over the hole, the design of the cycle line manifold below the distributor plate, the method of liquid introduction, i.e. whether single fluid or two fluid nozzles are used, the average particle size and particle size distribution of the liquid droplet in the gas, the average size and size distribution of the polymer particles in the fluid bed, and the type of fluidization and its quality.

Condensing penetration is also affected in a complex relationship between the choice of condensing agent and how close the cycle gas dew point approaches the resin bed temperature. The manipulation of the dew point of the recycle fluid with respect to the resin bed temperature is also called the dew point approach temperature. It may be adjusted by selection of condensing agents, condensing agent concentration, total pressure, composition and concentrations of the cycle gas and the temperature of the fluidized bed.

SUMMARY OF THE INVENTION

This invention is a method of discharging granular or particulate product from an exothermic fluidized bed polymerization reaction system operating in the condensing mode—that is, a fluidized bed system wherein fluid is removed from the reactor, cooled and/or condensed to remove the heat of reaction, and returned to the reactor. While the liquid in the fluid recycle is beneficial for the removal of the heat of reaction, thereby permitting enhanced production rates, liquid in the granular product is undesirable for a number of reasons mentioned above. We have determined that the quantity of liquid removed with the product during operation in the condensing mode can be minimized, without sacrificing efficiency of product removal by pressure difference, by removing product from bed levels of 0.21H to 0.59H. Product removal may be continuous or intermittent and may be conducted entirely by gas transfer, that is, by pressure difference (the difference in pressure between the reactor at the point of discharge and the product receptacle, referred to herein as the product discharge tank), but must be accompanied by appropriate venting of the product discharge tank to a low pressure location in the reaction system. The product discharge tank may be vented before, during or after the discharge valve is opened to allow product to enter the tank. In one method, the tank is vented about 1 to 60 seconds prior to opening the discharge valve, preferably about 5 to 15 seconds before opening the valve. In another method, the tank is vented at about the same time that the discharge valve is opened, recognizing that a few seconds may be required for the valve action to completely open the valve. In another method, the tank is vented 1 to 100 seconds after the discharge valve is opened, The gas in the product discharge tank is preferably vented to a point in the reactor that is above 0.6H, preferably above 0.8H. The vented gas from the product discharge tank may be sent to the fluidized bed, or to the transition or expanded section above the bed. The vented gas may also be sent to a lower pressure point in the gas recirculation loop such as at the suction side of the recirculation gas blower or downstream of a heat exchanger. A blower may also be employed on the vent line to return the gas from the product tank to a location in the reactor higher in pressure than that in the product tank. The gas sent to the reactor comprises both the gas originally in the product discharge tank and that which may be carried into it by the product discharge process—that is, by the flow of product and fluid from the reactor to the product discharge tank caused by the difference in pressure between them. The gas returned to the reactor will therefore include also gas which is vaporized from liquid carried with the product and transfer fluid from the reactor; such liquid may possibly accumulate somewhat in the product discharge tank before being vaporized. The returned gas includes significant amounts of unreacted monomer and therefore represents an economic benefit. Our invention is applicable to the condensing mode operated to any degree—that is, where the recycle fluid comprises anywhere from 1.0% to 95% liquid by weight or more, especially from about 2 to about 50 weight percent liquid.

It is necessary in our invention to continue to provide for a discharge site near the bottom of the bed, in order efficiently to empty the reactor and to provide for the removal of larger particles and agglomerates, sometimes called rubble, that may accumulate near the bottom of the bed. The lower discharge port may be below the distributor plate, just above it (0.002H to 0.15H), or, less desirably, at a level up to 0.2H; there may be more than one lower discharge port. It should be noted here that our references to the location of the lower discharge port and other ports in the fluidized bed are measured to the center of the port; both the lower and upper discharge ports are typically six to twelve inches in diameter. The lower discharge port may be operated intermittently as needed to remove rubble, or periodically, such as at the same time as the upper one described above if it is operated periodically during steady state operation of the reactor. It may be operated at varying rates, but in any case with the understanding that rubble removed from such a low level is highly likely to contain more liquid than product removed from the higher level. Rubble is not necessarily waste, but frequently will require some kind of special treatment if it is to be recycled or otherwise used. The lower product discharge is, however, normally conducted at times other than when the higher withdrawal is conducted. It may be conducted to the same product discharge tank as described above, and at the same time that the higher discharge process is conducted, or to a separate product discharge tank, other vessel or conveyor or blow tank, and/or at different times. It may be observed that one of the advantages of the present process is that it is not necessary for the primary product discharge tank to be lower than the reactor; the receptacle for product from the lowest levels of the bed generally will be lower than the reactor, sometimes necessitating an excavation below the pad for the reactor and/or requiring construction of an elevated platform or support for the reactor significantly above ground level.

The invention also includes the concepts of more than one product discharge tank and of a further tank below the initial product discharge tank, sometimes known as a blow tank, all as contemplated in the Aronson '952 patent. As is known in the art, the blow tank receives granular material from the product discharge tank and provides a separate zone for further preserving monomer. We also contemplate reducing the pressure in the product discharge tanks by cross tying them as also described in the Aronson patent.

Thus our invention includes a method of removing granular product from a fluidized bed polymerization reactor having a fluidized bed height H and operated in the condensing mode, comprising continuously or intermittently removing granular product from the reactor at least partially by gas transfer, at a level 0.02H to 0.8H preferably at a level 0.21H to 0.59H, to a product discharge tank vented to the reactor at a bed level of at least 0.6H, and providing for rubble removal at a lower level.

DETAILED DESCRIPTION OF THE INVENTION

Location of the product discharge port may be determined at least partly by determining the volume of liquid in the fluidized bed at various levels for the particular process used or most commonly used in the reactor. Within the range of elevations 0.02H and 0.8H and the preferred range of 0.21H and 0.59H, it is generally desirable to locate the discharge port at the level having the lowest liquid content in the particular polymerization process being conducted. Preferably, the fluidized bed at the level of product removal will be substantially free of liquid, that is, less than about 5 weight % liquid in the gas, more preferably less than 3 weight % liquid in the gas, and most preferably less than 1.5% by weight liquid in the gas. These are estimates based on polypropylene operational experience in which condensing levels of about 7 to 8 weight percent gave the initial indications of liquid in the product discharge system using a discharge port located about 6 inches above the plate. The preferred levels for polyethylene operation may be higher. It is known that the liquid tends to penetrate. further into the bottom of the bed during polypropylene condensing operation versus polyethylene condensing due to a number of differences in their operation including those of gas velocity, resin particle size and density, gas density and fluidization regime. Yet, the dew point approach, is thought to have the major effect. Polypropylene condensing mode operation is generally conducted approaching the average bed temperature. Dewpoint is typically within 10° C. of bed temperature, often only about 0.1 to 0.2° C. below average bed temperature. Temperatures in the lower portion of the bed are typically less than the bed average, so the resin at the distributor plate and several feet above it may be at dewpoint temperature. By comparison polyethylene condensing typically operates much further from the dewpoint. The dewpoint approach may be 20 or 30° and still achieve condensing levels greater than 15 weight percent. It is at very high levels of condensing for polyethylene, particularly as the dewpoint approaches to within about 10 C of the bed temperature that the most beneficial effects of this invention may be obtained.

Figure 1:
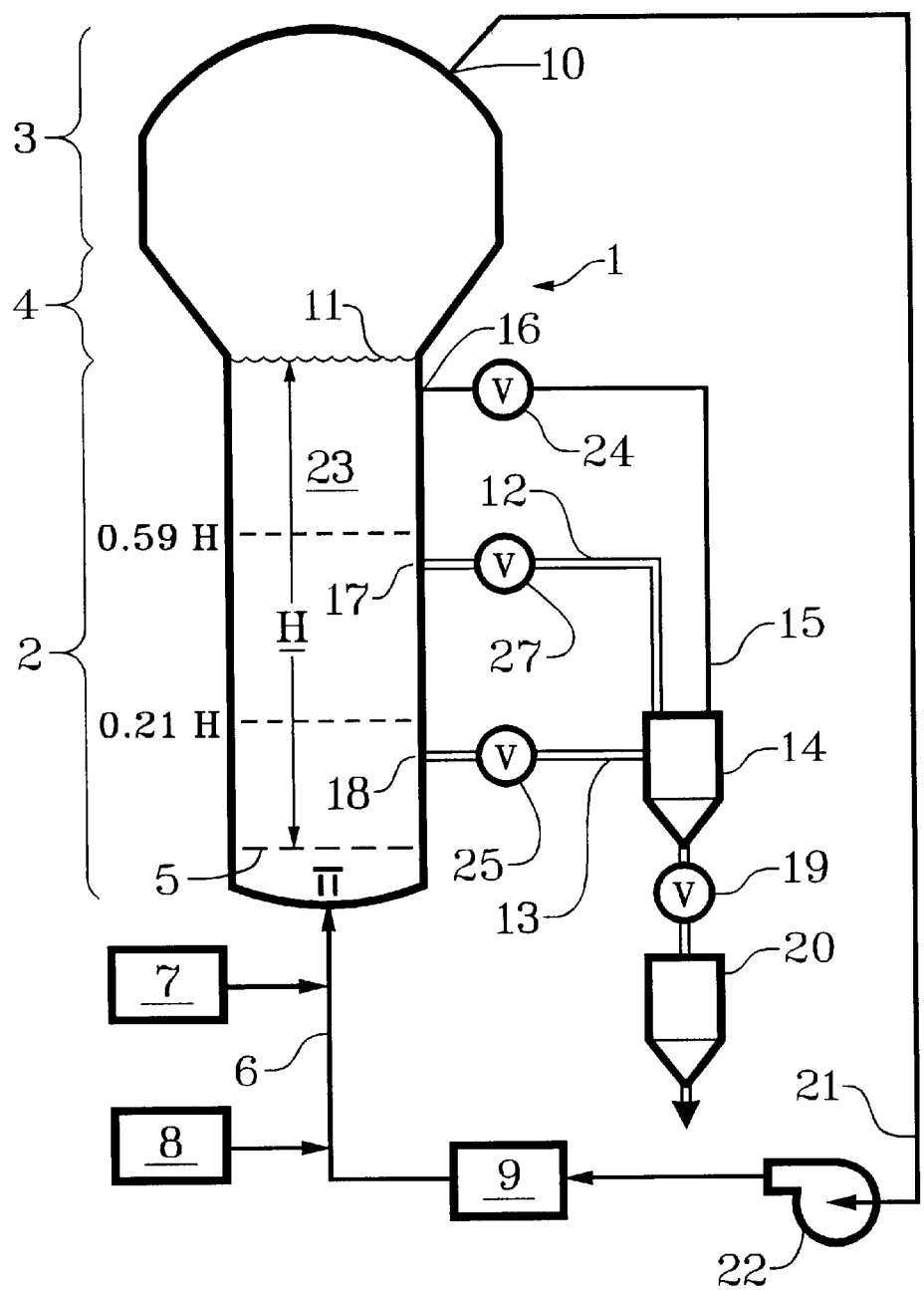
FIG. 1 is a diagram in the form of a flow sheet for a preferred configuration of equipment to conduct the present process.

Referring now to FIG. 1, reactor 1 is generally configured to have an upright cylindrical section 2, an upper expanded section 3 and a transitional conical section 4. Within the cylindrical section 2 is a distributor plate 5 for distributing fluid flowing through inlet pipe 6. Inlet pipe 6 introduces monomer, comonomer, hydrogen, nitrogen, and other optional materials from sources 7 and 8 as well as recycled fluid from cooler/condenser 9, which obtains fluid from outlet 10 near the top of expanded section 3. Catalyst is introduced directly into the reactor through a line not shown. The flow of recycle fluid to recycle line 21 may be assisted by blower 22.

Within cylindrical section 2 is the fluidized bed 23 of a height H from the distributor plate 5 to the top 11 of cylindrical section 2. The reactor I and appurtenances described so far are more or less conventional for condensing mode operation.

As indicated above, the product must be discharged from the continuously operating fluidized bed. Our system discharges product in a manner to avoid removing excessive quantities of liquid along with the product. To this end, an upper discharge port 17 is constructed, in the illustrated example at about 0.49H. More than one such upper discharge port 17 may be inserted around the periphery of cylindrical section 2. Each will be connected to product discharge line 12, which conveys granular product from fluidized bed 23 when discharge valve 27 is open, primarily by pressure difference—that is, by gas transfer, which may be assisted by gravity, from the relatively high pressure fluidized bed 23 to the relatively low pressure product discharge tank 14. The vent valve 24 may be opened before, at the same time, or after discharge valve 27 is opened, to assist in the escape of gas from product discharge tank 14 through vent line 15 to gas return opening 16, which is located at about 0.91H in the fluidized bed 23. The pressure at 0.91H is lower than that at 0.49H, the location of upper discharge port: 17, and accordingly both gas and product will continue to flow in product discharge line 12.

After product discharge tank 14 is filled to the extent desired, discharge valve 27 and vent valve 24 may be closed as is common in the art and blow tank valve 19 is opened to permit movement of the granular product from product discharge tank 14 to blow tank 20 more or less in a conventional manner.

During the product removal process through product discharge line 12 as described above, lower discharge line 13 may be opened or closed by lower discharge valve 25. Discharge line 13 connects to fluidized bed 23 through lower discharge port 18 located between distributor plate 5 and 0.21H. In the illustration, lower discharge port 18 is at a level about 0.125H. As an object of the present invention is to minimize liquid transfer into product discharge tank 14, in the configuration of FIG. 1 we prefer to use discharge line 13 intermittently as needed, when off-spec chunks (rubble) and the like are to be removed from the bottom of fluidized bed 23, independently of the operation of upper product discharge valve 27 and upper product discharge line 12. Discharge line 13 can also be used to empty the resin product from the reactor.

Figure 2:
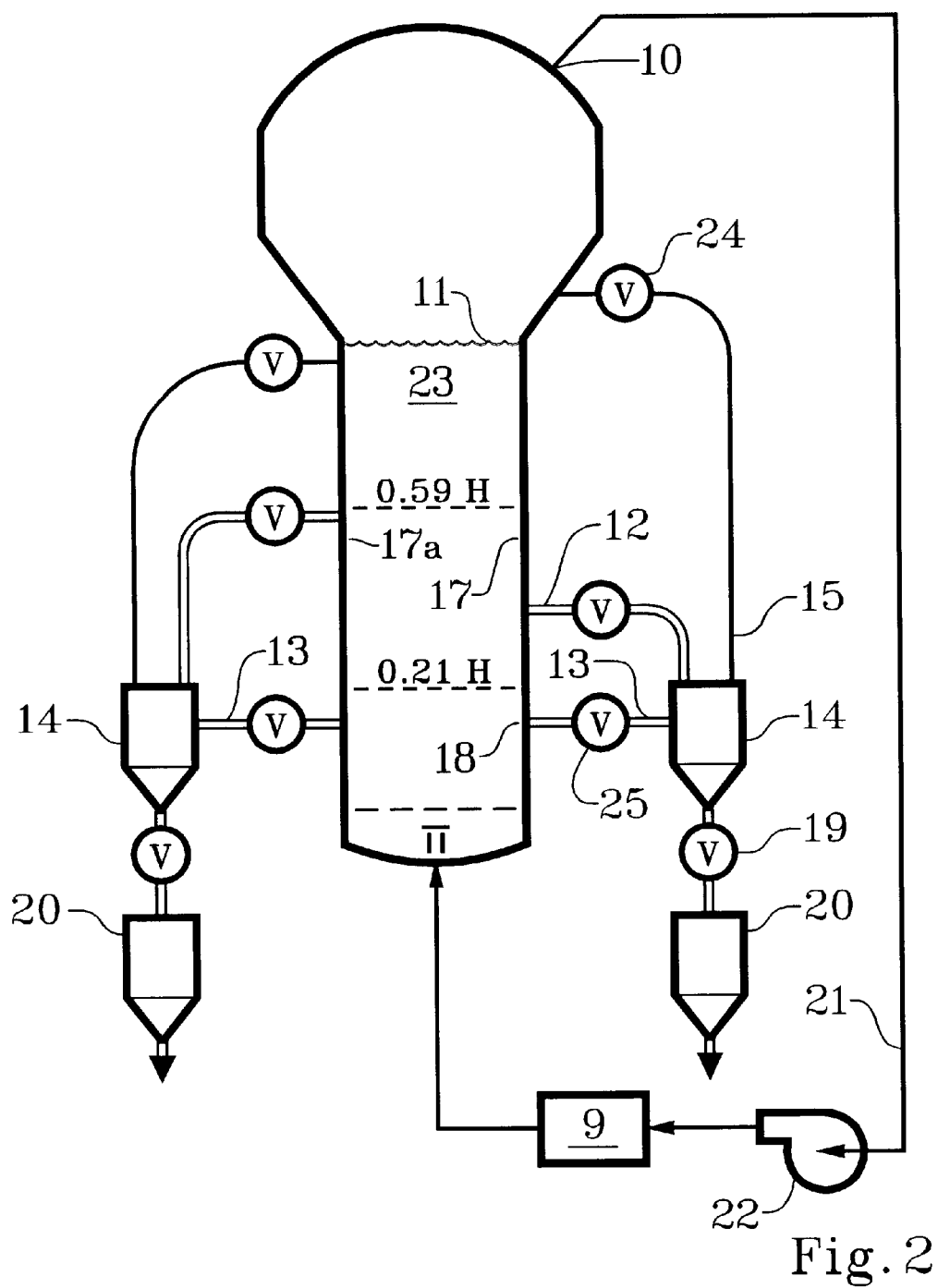
FIG. 2 is a diagram in the form of a flow sheet of a further preferred configuration of equipment for practicing the invention, where more than one product discharge tank is used.

Referring now to FIG. 2, a variation of our invention is depicted in which there is more than one product discharge tank 14 and more than one blow tank 20. This variation also illustrates that upper discharge ports 17 and 17a may be at different levels—in the depicted configuration, upper discharge port 17 is located at about 0.48H and product discharge port 17a is at about 0.57H. Product discharge lines 12 may be curved rather than contain a right angle as in FIG. 1. Vent line 15 may connect to the transitional conical section 4 rather than the top of the fluidized bed 23 as in FIG. 1. Where there is more than one product discharge tank 14 such as in FIG. 2, the discharge of product may be alternated from one product discharge tank 14 to the other, and cross-ties may be made to optimize the pressure differences between the fluidized bed 23 and the product discharge tanks, to conserve monomer in the gas accompanying the granular product. A lower discharge line 13 may, if desired, operate to remove rubble only at one or more locations at a time, as depicted in FIG. 2.

Figure 3:
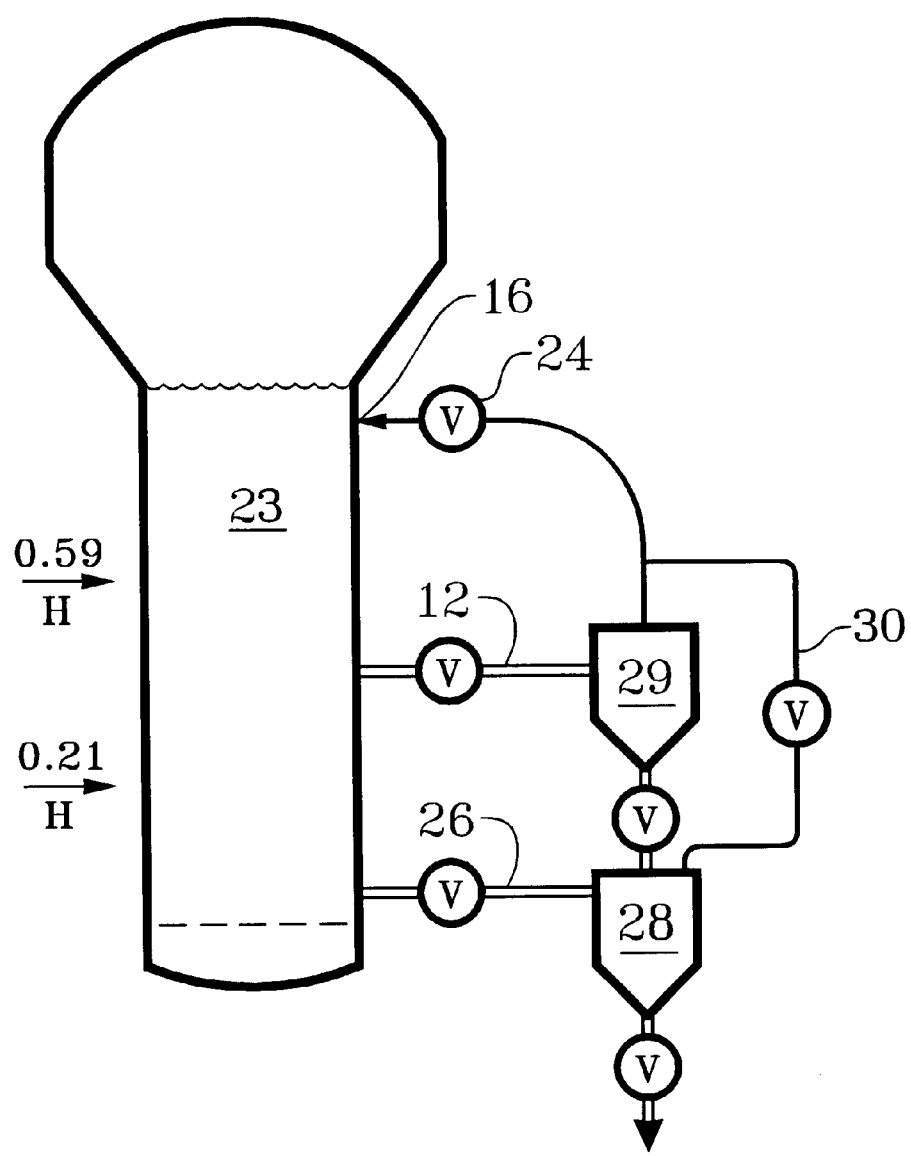
FIG. 3 is a diagram of a third configuration of our invention, showing a rubble discharge line connected directly to a blow tank.

FIG. 3 shows a variation of our invention wherein a lower discharge line 26 leads from the lower regions of the fluidized bed 23 directly to a blow tank 28 rather than to a primary product discharge tank 14 as in FIGS. 1 and 2. Here, primary product discharge tank 29 receives product through product discharge line 12 as in FIGS. 1 and 2, but is not connected directly to a lower discharge line such as lower discharge line 26 (FIG. 3) or 13 (FIGS. 1 and 2). Otherwise, the product discharge operation is similar to those of FIGS. 1 and/or 2; there may be more than one product discharge tank 29 and more than one blow tank 28. This figure also illustrates a vent line 30 running from blow tank 28 to product discharge tank 29, which may also be set up in the variations of FIGS. 1 and 2. The recycle system, similar to that of FIGS. 1 and 2 (see lines 21 and 6) is not shown in FIG. 3. The fill efficiency of blow tank 28 may be enhanced through the use of vent line 30 and valve 24.

In any of the variations of our invention, the upper discharge port 17 and/or 17a is/are located at one or more elevations or levels of about 0.02H to 0.8H, preferably between 0.21H and 0.59H, each preferably at a level where there is less than ten percent by weight liquid in the gas in the fluidized bed, preferably where there is less than five percent (5%) liquid by weight, more preferably where there is less than 3% liquid by weight in the gas, and most preferably where there is less than 1.5% liquid by weight in the gas.

Preferably the lower product discharge port 18 will be located slightly above the distributor plate 5—that is, in the range of about 0.002H to 0.2H, preferably 0.005H to 0.15H, and most preferably from 0.01H to 0.1H. The elevated or upper discharge port is located a minimum of about 6 inches higher than the lower discharge port as measured from the midpoint of each port. The upper discharge port will be located above the lower discharge port in the range of about 0.02H to 0.8H, in one preferred range about 0.1H to 0.7H and in another preferred range about 0.21H to 0.59H.

The time required for product discharge is calculated in Table I for various differential bed heights—that is the vertical distance between the product discharge port and the point of entrance of the vent from the product discharge tank. A basis of the calculations was that the valve 24 (FIG. 1) is opened as soon as valve 27 is opened.

The estimation of polymer discharge time recognizes a complex relationship involving the vent line size, flow resistance, polymer density, gas density, pressure, differential bed height, slip between the flow of gas and solid phases, and tank size. For the summary provided in Table 1 both 8 and 10 inch diameter vent lines were postulated. The effect of increasing discharge time with decreasing differential bed height is illustrated in the results of Table 1. The discharge time shown does not include the additional 9 or 10 seconds required to complete valve action. As may be apparent from Table 1, and in reference to Aronson's U.S. Pat. No. 4,621, 952, column 4, line 44, it becomes difficult to achieve the overall drop duration if the differential height between the discharge port and the vent is insufficient. The overall drop duration is the discharge process cycle time—that is, the time required to receive, handle, and transfer the product). In the process, settled resin fills the discharge tank to about 50 to 95% of the tank volume, commonly from about 60 to 90% of the tank volume.

As is apparent from Table 1 and referring again to U.S. Pat. No. 4,621,952 at column 4, line 44, it becomes difficult to achieve the overall drop duration if the differential height between the discharge port and vent is insufficient. The overall drop duration is the discharge process cycle time (i.e. the time required to receive, handle and transfer the product). In the process, settled resin fills the discharge tank to about 50% to 95% of the tank volume, commonly from about 60 to 90% of the tank volume.

For reasonable system design of a commercial polyethylene facility the available time for discharge and valve action is normally below 40 seconds, but can be designed for up to twice that time. Assuming 10 seconds for valve action, this bounds the actual product discharge time to about 30 seconds. For a polyethylene facility designed for a 60 ft bed height, the maximum elevation of the discharge nozzle above the distributor plate would be about 45 feet which is about 0.75H (the upper limit of our designated range is 0.8H to allow for variations in construction and operation). It follows that achievement of an optimum discharge time under typical or normal conditions requires a vertical differential of at least fifteen feet (15'), or about 0.25H, between the upper discharge port and the entry of the vent to the reactor. Because of the variations in construction and operation of reactor systems, some of which may tolerate slower product delivery, we have determined that a minimum of 0.1H vertical differential should be used.

TABLE 1

Discharge Time (Excluding Valve Action Time) Required to Fill a Product Discharge Tank at Various Differential Bed Heights (Differential Bed Height = Vertical Distance Between Product Discharge Port and Vent Entrance)

| Polymer | Minimum Bulk Density (lb/ft³) | | Vent Gas Density (lb/ft³) | Diff. Bed Ht. (ft) | Discharge Time (seconds) | |
|---|---|---|---|---|---|---|
| | Settled | Fluidized | | | 8 inch vent | 10 inch vent |
| Polyethylene | 20.0 | 14.7 | 1.44 | 52 | 13.7 | 12.5 |
| | | | | 45 | 14.8 | 13.5 |
| | | | | 40 | 15.8 | 14.3 |
| | | | | 35 | 17.0 | 15.4 |
| | | | | 30 | 18.5 | 16.7 |
| | | | | 25 | 20.5 | 18.6 |
| | | | | 20 | 23.2 | 21.1 |
| | | | | 15 | 27.7 | 25.1 |
| | | | | 10 | 36.1 | 32.8 |
| | | | | 5 | 66.7 | 37.5 |
| Polypropylene Homopolymer | 17.0 | 7.50 | 4.90 | 56 | 84.3 | 57.8 |
| | | | | 52 | 87.6 | 60.0 |
| | | | | 45 | 94.1 | 64.5 |
| | | | | 40 | 99.8 | 68.5 |
| | | | | 35 | 106.7 | 73.2 |
| | | | | 30 | 155.2 | 79.1 |
| | | | | 25 | 126.2 | 86.6 |
| | | | | 20 | 141.2 | 96.8 |
| | | | | 15 | 163.0 | 111.8 |
| | | | | 10 | 199.6 | 136.9 |
| | | | | 5 | 282.2 | 193.6 |
| Random Polypropylene | 14.5 | 7.00 | 4.75 | 56 | 94.5 | 62.9 |
| | | | | 52 | 98.1 | 66.6 |
| | | | | 45 | 105.6 | 70.2 |
| | | | | 40 | 111.9 | 74.5 |
| | | | | 35 | 119.6 | 79.6 |
| | | | | 30 | 129.2 | 86.0 |
| | | | | 25 | 141.9 | 94.2 |
| | | | | 20 | 158.2 | 105.3 |
| | | | | 15 | 182.7 | 121.6 |
| | | | | 10 | 223.7 | 148.9 |
| | | | | 5 | 316.4 | 210.6 |

For reasonable system design of a commercial polypropylene facility the available time for discharge and valve action is normally less than about 80 seconds. Assuming 10 seconds for valve action, this bounds the actual polymer discharge time to about 70 seconds. As shown above in Table 1, for polypropylene service, a 10 inch diameter vent line is required and the minimum differential bed height is about 45 feet. For a polypropylene facility designed for a 60 foot bed height, the maximum elevation of the discharge nozzle above the distributor plate would be about 15 feet, which is about 0.25H.

When designing a discharge system, the penalty for increasing discharge time can be somewhat overcome by using larger valves and conveying line diameters. This reduces the duration of the other steps in the discharge sequence.

Flow of vent gas in vent line 15 may be assisted by a compressor or blower. Other possible means for assisting the flow and/or reducing the pressure are to connect the vent line to a low pressure point in the gas recirculation loop such as the suction side of the cycle gas blower. See, for example, EP 0870539, which discloses a method in which gas is vented to the cycle gas recirculation loop at a location downstream of the cycle gas cooler and before the blower.

Our invention may include the following (non-limiting) variations and additional practices:

Purging

Product entering or being held in the product discharge tank(s) 14 or 29 and/or the blow tank(s) 20 or 28 may be purged with dry gas. By "dry" gas we mean simply that the gas is drier than its target. Purging may also be performed in the product discharge line 12. The dry gas may come from outside the system, may be dry recycle gas, or may be dry gas from product containers or vessels. Dried recycle gas may be obtained, for example, from the outlet of blower 22. The purge gas may be primarily monomer, inert, gas used to adjust the dew point or percent condensing elsewhere in the system, or mixtures of any of these. The purge may take place at any time the product is held, and the resulting fluid or gas, containing fluid which was in the product and, after the purge, in the purge gas, may be returned to the reactor. The addition of dry gas at the point of entrance to the product discharge tank will minimize the accumulation of liquid in the tank. Additionally or alternatively, a form of purging may be practiced wherein dry gas is introduced to the reactor in the proximity of the upper discharge port 17 or the sweep port 18, to reduce the amount of liquid present.

Pumping Liquid from the Product Discharge Tank

If liquid accumulates in the product discharge tank(s) or the blow tank(s), it may be removed by pumping, preferably before the lower discharge valve is opened. The liquid may be separated from the granular product by filters, baffles, dip tubes or other known means. Liquid recovered in this manner may be returned directly to the reactor (possibly through line 6 or injected into the recycle line 21.

Second-Stage Condensing

By second-stage condensing, we mean that a portion of the fluid in line 6, after exiting cooler/condenser 9, is separated from line 6 and run through an additional cooler/condenser. This practice is most efficient if the portion run through the additional cooler/condenser is primarily gaseous. The purpose is to increase the liquid content of the fluid reentering the reactor, so that its vaporization within the reactor will absorb an additional increment of the heat of reaction, thus enabling operation of the system at a higher rate. Although this practice means it is highly likely there will be more liquid in the fluidized bed than otherwise, our invention is compatible with it and in fact will assist in providing an acceptable, relatively dry, product in spite of such increased liquid content in the fluidized bed.

Recycle Reduction

In another variation of our invention, the cycle fluid recirculation rate is decreased by about 2.5% to 80%, preferably about 5 to 50%, and most preferably about 5% to 10%, shortly before (0.1 second or up to 60 seconds before) and/or during the upper resin discharge to the product tank such that the height of penetration of liquid into the bed is reduced. The fluid velocity may remain in the reduced state until perhaps 30 seconds before the upper discharge valve closes or until 15 seconds after the upper discharge valve closes. Preferably the gas (fluid) velocity is returned to about its original level within about 20 seconds before to about the same time the discharge valve closes. In one method, the bed temperature is allowed to oscillate slightly during this time. The temperature control system can be adjusted to compensate gently for these oscillations without driving the system substantially deeper into condensing. The gas velocity is restored to its original value after the resin discharge is complete or near-complete, but may be increased somewhat for a brief period to compensate for the loss of cooling. The temperature control can be adjusted to ignore or to gently compensate for the changes in gas velocity. Temperature rise in the bed may be about 0.2 to 5.0° C., but preferably within the range of about 0.3 to 1.5° C.

What is claimed is:

1. A method for operating a fluidized bed polymerization reactor to remove a granular product therefrom, the reactor having a fluidized bed height H above a distributor plate and being operated in a condensing mode, comprising:
    (a) operating the reactor in condensing mode;,
    (b) moving the granular product from the reactor, by opening an upper discharge valve for an upper discharge port in the reactor at a height from 0.21H to 0.6H, to a product discharge tank after opening the upper discharge valve;
    (c) venting the product discharge tank from a vent to the reactor, the product discharge tank being vented to the reactor at least 0.1H higher than the upper discharge port; and
    (d) removing larger particles or agglomerates from the distribution plate by opening a lower discharge valve for a lower discharge port at a level lower than the upper discharge port and no higher than 0.2H.

2. The method of claim 1, wherein said product discharge tank is vented to said reactor at a level higher than 0.8H.

3. The method of claim 1, wherein said reactor is operated at least 5% condensing mode.

4. The method of claim 1, wherein said reactor is operated at least 20% condensing mode.

5. The method of claim 1, wherein said reactor is operated at from about 30 to about 90% condensing mode.

6. The method of claim 1, wherein said granular product is removed at a level of 0.3H to 0.59H.

7. The method of claim 1, wherein said larger particles or agglomerates are removed to a vessel other than said product discharge tank.

8. The method of claim 1, wherein said granular product is moved in step (b) for a period of 20 to 60 seconds.

9. The method of claim 1, wherein said operation in condensing mode includes a second stage cooling and condensing step conducted on recycled fluid.

10. The method of claim 1, wherein said larger particles or agglomerates are removed at a level between 0.005H and 0.15H.

11. The method of claim 1, wherein said granular product is polyethylene.

12. The method of claim 1, wherein said granular product is polypropylene, and said product discharge tank is vented at least about 0.75H above said upper discharge port.

13. The method of claim 1, wherein said larger particles or agglomerates are removed at a level between 0.01H and 0.1H.

14. The method of claim 1, wherein the granular product is removed in step (b) at a level in said fluidized bed having less than 10 weight percent liquid.

15. The method of claim 14, wherein there is less than 5 weight percent liquid at said level.

16. The method of claim 7, wherein said removal of large particles or agglomerates through said lower discharge port are made to a blow tank.

17. The method of claim 1, wherein said discharge ports or said vent lines are purged with gas when not in use.

18. A method for operating a fluidized bed polymerization reactor to remove a granular product therefrom, the reactor having a fluidized bed height H above a distributor plate and being operated in a condensing mode, comprising.
    (a) operating the reactor in condensing mode;
    (b) moving the granular product from the reactor, by opening an upper discharge valve or an upper discharge port in the reactor at a height from 0.21H to 0.8H, to a product discharge tank after opening the upper discharge,valve;
    (c) venting the product discharge tank to the reactor by opening a vent valve, the product discharge tank being vented to the reactor at least 0.1H higher than the upper discharge port, and the upper discharge valve and the-vent valve being open at the same time to create a pressure difference between the vent and the discharge port to remove the granular product from the discharge port; and
    (d) removing larger particles or agglomerates from the distribution plate by opening a lower discharge valve for a lower discharge port at a level lower than the upper discharge port and no higher than 0 2H.

19. The method of claim 18, wherein said product discharge tank is vented to said reactor at a level higher than 0.8H.

20. The method of claim 18, wherein said reactor is operated at least 5% condensing mode.

21. The method of claim 18, wherein said reactor is operated at least 20% condensing mode.

22. The method of claim 18, wherein said reactor is operated at 30–90% condensing mode.

23. The method of claim 18, wherein said granular product is removed at a level of 0.3H to 0.59H.

24. The method of claim 18, wherein said larger particles or agglomerates are removed to a vessel other than said product discharge tank.

25. The method of claim 18, wherein said granular product is moved in step (b) for a period of 20 to 60 seconds.

26. The method of claim 18, wherein said operation in condensing mode includes a second stage cooling and condensing step conducted on recycled fluid.

27. The method of claim 18, wherein said larger particles or agglomerates are removed at a level between 0.005H and 0.15H.

28. The method of claim 18, wherein said granular product is polyethylene.

29. The method of claim 18, wherein said granular product is polypropylene, and said product discharge tank is vented at least about 0.75H above said upper discharge port.

30. The method of claim 18, wherein said larger particles or agglomerates are removed at a level between 0.01H and 0.1H.

31. The method of claim 18, wherein the granular product is removed in step (b) at a level in said fluidized bed having less than 10 weight percent liquid.

32. The method of claim 31, wherein there is less than 5 weight percent liquid at said level.

33. The method of claim 24, wherein said removal of larger particles or agglomerates through said lower discharge port are made to a blow tank.

34. The method of claim 18, wherein said discharge ports or said vent lines are purged with gas when not in use.

35. A method for operating a fluidized bed polymerization reactor to remove a granular product therefrom, the reactor having a fluidized bed height H above a distributor plate and being operated in a condensing mode, comprising:

(a) operating the reactor in condensing mode, the reactor running a polymerization reaction within about 10° C. of the dewpoint of a monomer feed for a polymerization reaction;

(b) moving the granular product from the reactor, by opening an upper discharge valve for an upper discharge port in the reactor at a height from 0.21H to 0.8H, to a product discharge tank after opening the upper discharge valve;

(c) venting the product discharge tank to the reactor by opening a vent valve, the product discharge tank being vented to the reactor at least 0.1H higher than the upper discharge port, and the upper discharge valve and the vent valve being open at the same time to create a pressure difference between the vent and the discharge port to remove the granular product from the discharge port; and (d) removing larger particles or agglomerates from the distribution plate by opening a lower discharge valve for a lower discharge port at a level lower than the upper discharge port and no higher than 0.2H.

36. The method of claim 35, wherein said granular product is polyethylene.

37. The method of claim 35, wherein said granular product is polypropylene.

38. The method of claim 35, wherein said granular product is removed at a level of 0.3H to 0.59H.

39. A method for operating a fluidized bed polymerization reactor to remove a granular product therefrom, the reactor having a fluidized bed height H above a distributor plate and being operated in a condensing mode, comprising:

(a) operating the reactor in condensing mode, the reactor running a polymerization. reaction within about 10° C. of the dewpoint of a monomer feed for a polymerization reaction;

(b) moving the granular product from the reactor, by opening an upper discharge valve for an upper discharge port in the reactor at a height from 0.21H to 0.8H, to a product discharge tank after opening the upper discharge valve;

(c) venting the product discharge tank to the reactor by opening a vent valve, the product discharge tank being vented to the reactor at least 0.1H higher than the upper discharge port, and the upper discharge valve and the vent valve being open at the same time to create a pressure difference between the vent and the discharge port to move the granular product from the reactor through the discharge port at least partially by gas transfer for a period of up to 70 seconds; and (d) removing larger particles or agglomerates from the distribution plate by opening a lower discharge valve for a lower discharge port at a level lower than the upper discharge port and no higher than 0.2H.

40. The method of claim 39, wherein said granular product is polyethylene.

41. The method of claim 39, wherein said granular product is polypropylene.

42. The method of claim 39, wherein said product discharge tank is vented to said reactor at a level higher than 0.8H and said granular product is removed at a level of 0.3H to 0.5H.

\* \* \* \* \*